(12) United States Patent
Grinberg et al.

(10) Patent No.: US 7,390,561 B2
(45) Date of Patent: Jun. 24, 2008

(54) METHOD FOR MAKING A METAL SURFACE INFUSED COMPOSITE AND THE COMPOSITE THEREOF

(75) Inventors: Grigoriy Grinberg, Sylvania, OH (US); Matthew M. Shade, Plymouth, MI (US)

(73) Assignee: Praxair S. T. Technology, Inc., North Haven, CT (US)

( * ) Notice: Subject to any disclaimer, the term of this patent is extended or adjusted under 35 U.S.C. 154(b) by 0 days.

(21) Appl. No.: 10/675,983

(22) Filed: Oct. 2, 2003

(65) Prior Publication Data
US 2005/0074597 A1   Apr. 7, 2005

(51) Int. Cl.
B32B 5/18 (2006.01)
B32B 15/08 (2006.01)

(52) U.S. Cl. ............... 428/307.3; 428/312.8; 428/319.3; 428/457; 427/446; 427/455; 427/456

(58) Field of Classification Search ................. 428/457, 428/458, 416, 297.4, 304.4, 306.6, 307.3, 428/312.8; 427/446, 455, 456, 404, 407.1
See application file for complete search history.

(56) References Cited

U.S. PATENT DOCUMENTS 5,073,589 A * 12/1991 Milovich et al. ............ 524/439
5,296,183 A *  3/1994 Carbone et al. ............ 264/131
5,427,676 A *  6/1995 Domanski et al. .......... 205/122

* cited by examiner

Primary Examiner—Monique R Jackson
(74) Attorney, Agent, or Firm—Gerald L. Coon

(57) ABSTRACT

A metal surface infused composite object made by thermal spraying a metal material onto a release agent coated pattern, followed by vacuum infusion at least a portion of the metal material layer with a resin and then separating the composite infused metal object from the pattern.

18 Claims, 1 Drawing Sheet

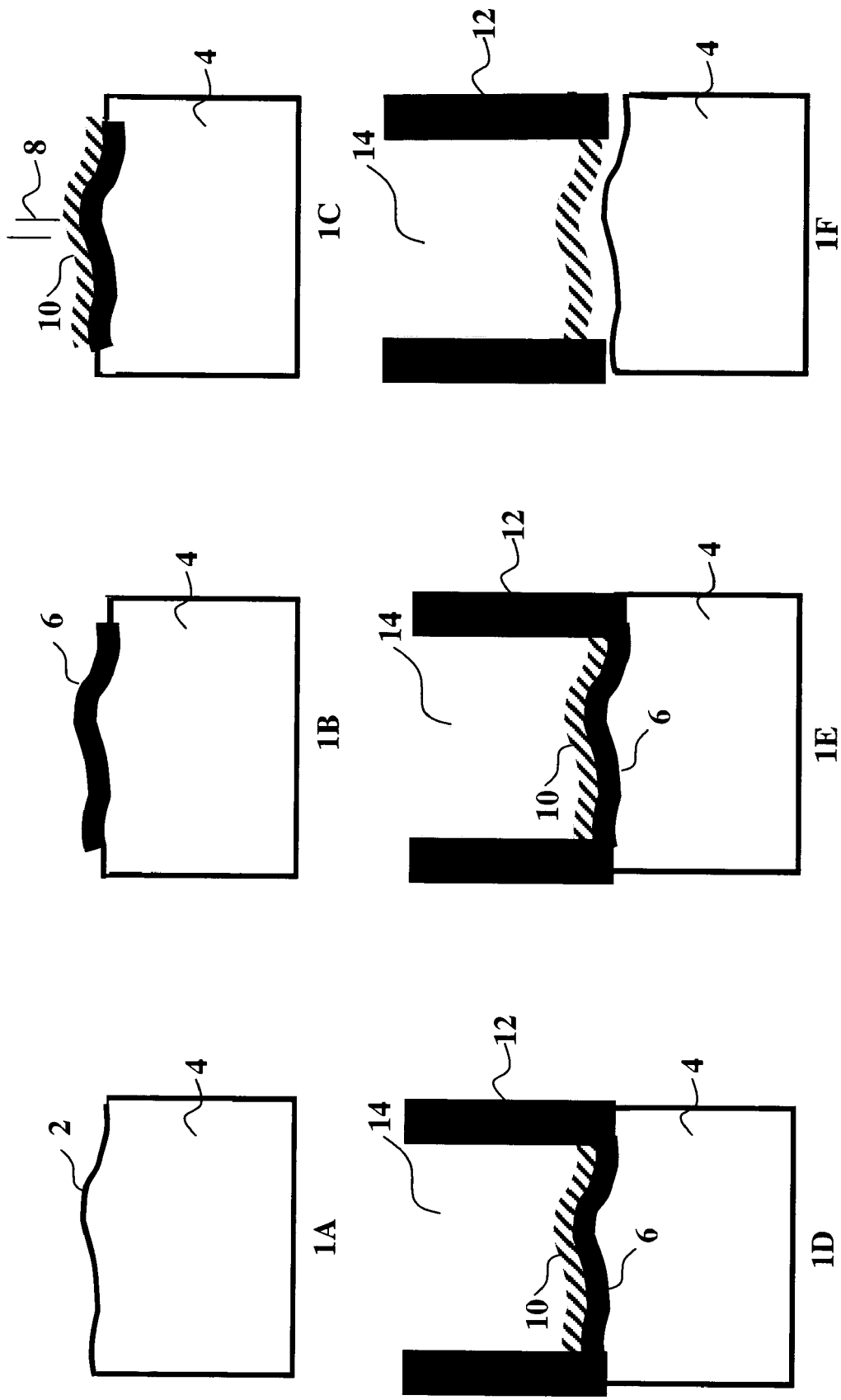

METHOD FOR MAKING A METAL SURFACE INFUSED COMPOSITE AND THE COMPOSITE THEREOF

FIELD OF THE INVENTION

The invention relates to a method of producing a composite object with an infused metal surface, where a thermal spray metal material layer is applied to a release agent coated pattern, mold or tool face, followed by a composite backing structure. The composite backing structure can be produced by resin infused fiber or similar filler. The thermal sprayed material and the composite backing structure result in a metal surface infused composite object when separated from the pattern, mold, or tool face.

BACKGROUND OF THE INVENTION

Examples of thermal spray methods that are useful for spraying metal are arc wire spray, flame spray, HVOF, plasma spray, D-gun, cold spray(gas dynamic) and the like. Generally a method used to apply a metal on a composite object consists of applying a layer of metal(coating)directly on the surface using vacuum metalizing, metal sleeves, covers or electroplating. These methods are all topical and are bonded mechanically to the outer surface of the object. The present invention relates to a method where the spray metal material layer is impregnated or infused with resin during the manufacture of the composite object.

It is an object of the present invention to provide a novel method for spraying metal materials on a pattern, preferably low heat resistant patterns, but not limited to, and then backing the sprayed material layer with fiber and infusing with a resin, to produce, when separated from the pattern, a metal surface infused composite object.

SUMMARY OF THE INVENTION

In at lease one embodiment, the present invention relates to a method for making a metal surfaced composite object which comprises;
  preparing a pattern with a contour of a desired shape;
  applying a release agent on at least a portion of the pattern;
  applying a thermal spray material onto the release agent layer;
  integrating the thermal spray material layer into a composite object by backing and infusing the sprayed material layer with a resin; and
  separating the composite object from the release agent coated pattern to produce a sprayed material surface infused composite object.

Preferably step (d) and be replaced with step (d') as follows: integrating the thermal spray material layer into a composite object by backing the sprayed material layer with fiber and infusing with a resin.

The release agent should be a material that has thermal and chemical characteristics that are compatible with the sprayed material, such as metals, and do not deform the surface contour and details of the pattern, especially a low heat resistant substrate. Suitable release agents can be selected from the group comprising epoxies, acrylics, urethanes, polyvinyl acetate (PVA) and the like. Suitable solvents can be used to create a tacky surface. The preferred release agents are polyurethane, epoxies and polyvinyl acetate (PVA). For most applications, the thickness of the release agent layer can vary between 0.0001 inch and 0.020 inch, preferably between 0.0005 inch and 0.005 inch. When using a water base release agent, water can be used as the solvent. Other release solutions are any compatible chemical solution that will weaken the release agent and thereby facilitate the separation of the composite object from the pattern.

The thermal spray coating material can be applied with a high gun-to-substrate linear velocity to balance the thermal input to the substrate. High linear velocity will create thin low stress layers. Typically the linear velocity is greater than 0.5 m/s or a power input factor from 0.5 to 45 watts/mm/s. The lower the heat resistance of the substrate, the greater the linear velocity of the spray gun. The thickness of the thermal spray coated layer could be between 0.0001 inch and 3.0 inch, preferably between 0.005 inch and 0.125 inch. The material of the thermal spray layer is preferably metal and can be selected from the group consisting of steel, stainless steel, nickel, invar, chrome, tungsten, aluminum, zinc, alloys and compounds thereof.

In preferred applications, the release agent material should have good adhesive characteristics that would sufficiently bond and secure the metal spray to the pattern, but releasable by a chemical which breaks down the release agent or by a suitable force to separate the pattern from the composite infused sprayed material object. For example, the finished metal surface infused composite object could be selected from the group comprising tools, aircraft components, automobile components, electrical components, recreation components, home products, or any composite component exposed to wear, erosion, corrosion, electrical current, electromagnetic fields, etc.

Essentially, almost any metal or alloy which can be made into powder or wire can be sprayed, including steel, stainless steel, nickel, invar, chrome, tungsten, aluminum, zinc, alloys and compounds thereof. The thermal spray material could preferably be a metal matrix ceramic composite.

The thermal spray parameters can be varied to produce a dense layer of spray material at the pattern face and a more porous layer as the material thickness increases. Preferably, the outer material layer, such as between about 5% and about 50% of the thickness of the layer, can have a porosity of between about 5 and about 95 percent or preferably between about 25 and about 75 percent, and the inner layer portion at the pattern surface, such as between 5% to about 50% of the thickness of the layer, can have a theoretical density of between about 99.9 and about 95 percent. In some applications, the entire deposited metal layer could be highly porous or over 5% and preferably a porosity between about 25% and about 75%. In other applications, the initial dense layer will produce a hard outer surface when the composite infused object is separated from the pattern.

To infuse or impregnate a resin into the porous segment of the deposited outer metal surface, a force is necessary that will exert pressure on the resin material so that a portion of the resin material will be forced into the pores of the deposited porous surface. The force necessary for the impregnation can be pressure from a vacuum source, mechanical source, hydraulic source and the like. Preferably, the resin and fiber contacting the outer porous spray material can be subject to a vacuum in which a force will result in at least a portion of the resin being infused into the pores of the porous spray material surface, thereby infusing the resin into the deposited sprayed metal layer. Resins, Carbon fiber, Glass Fiber, Nylon Fiber, Prepreg materials and other types of fiber, fabrics and resins can be used in this process.

BRIEF DESCRIPTION OF THE DRAWINGS

The invention will be described with reference to the accompanying drawing in which FIGS. 1A through 1F are schematic views showing a method for making a metal surface impregnated composite.

DESCRIPTION OF THE PREFERRED EMBODIMENT

As shown in the drawings, the basic steps of the method comprise:

Preparing a suitable mold, tool, or pattern surface(2) of pattern 4 for which a faithful reproduction of a metal surface infused composite object is needed. The pattern 4 could be a low heat resistant material such as wood. If necessary, the pattern surface 2 must be thoroughly cleansed of all wax, oils, fingerprints and other foreign material as defects on the surface will be reproduced in the final composite object. Contamination in many cases will prevent the sprayed metal from bonding in its early stages of spraying. In some cases, sealing of the pattern surface 2 may be required to facilitate release of the composite object;

A release agent 6 is applied to the pattern surface 2. This is required to assure adhesion of the first coat of sprayed metal and to facilitate removal of the metal surface infused composite object after completion. Polyvinyl acetates have been found most satisfactory for this application. The release agent must have adequate thermal and chemical characteristics to be compatible with the sprayed metal and not dramatically reduce surface detail. The polyvinyl acetate should be applied carefully to produce a uniformly thin film. In some applications, surface detail can be enhanced by warming of the polyvinyl acetate, and on a microscale compacting the release agent to assure faithful reproduction of surface detail;

Allowing the polyvinyl acetate to dry for a few minutes and then applying an application of the sprayed material 8, such as a stainless steel material 10. The initial material deposit can be applied to produce a dense layer and then subsequent material deposit can be applied to produce a porous outer surface layer. The thermal spray material for a wire arc spray process can be normally accomplished at a spray rate of 120 amps (10 lbs/hr/gun) and care is taken to assure that the entire surface 6 is covered. Once the thermal spray material reaches a suitable thickness, the spray rate can be increased up to 30 lbs/hr/gun depending upon the size of the surface to be sprayed, the type of spray material and the porosity range. In all cases, during the entire spraying process, care must be taken to assure that the surface does not become overheated. On small patterns to eliminate overheating, compressed air or other gases are blown on the part to facilitate cooling. Generally the spraying continues until 0.030 inch of metal or some other thickness is achieved. In some cases, components have been sprayed up to 0.25 inch thick for additional strength or machining stock. Using a lay-up process, fibers and resin 14 can be applied to the spray deposited layer. If desired, tubes for heating or cooling, reinforcement objects or the like could be incorporated in the fiber/resin. Although not shown, the assembly of 2-6-10-14 can be subjected to a vacuum which will force a portion of the resin 14 into the porous segment of spray material layer 10. A mechanical pressure force or other method could also be used to infuse the resin material 14 into the porous metal layer 10. When using a vacuum process for infusion, a sealing device or surface 12 around the perimeter of the composite object is necessary. Then allowing the resin 14 to cure and/or harden. Separating the pattern from the metal surface impregnated composite 2-10 via the release agent 6 and removing the composite object to produce a free standing metal surface infused composite object. In some applications, the external surface of the composite object could be cleaned to remove any of the release agent and other contaminants. Also, the surface of the pattern could be thoroughly cleaned and then reused to produce other metal surface infused composite objects.

Other variations of the disclosed method are within the intended scope of this invention as claimed below. As previously stated, detailed embodiments of the present invention are disclosed herein; however, it is to be understood that disclosed embodiments are merely exemplary of the invention that may be embodied in various forms.

What is claimed:

1. A thermal sprayed metal or metal alloy material surface infused or impregnated composite object comprising a solid composite material of fiber and resin in which at least a portion of the resin composite material is infused or impregnated into the thermal sprayed metal or metal alloy material surface of a thermal spray metal or metal alloy material layer, said thermal spray metal or metal alloy material layer having an inner dense layer of thermal spray metal or metal alloy_material and a more porous outer layer as the thickness of the thermal spray metal or metal alloy material layer increases; wherein said thermal spray metal or metal alloy_material layer has a thickness of between 0.0001 and about 3 inches, said inner layer has a theoretical density of between about 95 and about 99.9 percent and comprises from about 5 to about 50 percent of the thickness of said thermal spray metal or metal alloy material layer, and said outer layer has a porosity of between about 5 and about 95 percent and comprises from about 5 to about 50 percent of the thickness of said thermal spray metal or metal alloy material layer.

2. The thermal sprayed metal or metal alloy material surface infused or impregnated composite object of claim 1 wherein the porous portion of the thermal sprayed metal or metal alloy material surface has a theoretical density of between about 25% and about 95%.

3. A method for making a thermal sprayed metal or metal alloy material surface infused or impregnated composite object comprising:
   (a) preparing a pattern with a contour of a desired shape;
   (b) applying a release agent layer on at least a portion of the pattern, wherein said release agent layer is applied to a thickness of between about 0.0001 and about 0.020 inches;
   (c) applying a thermal spray metal or metal alloy material layer onto the release agent layer by a thermal spray method, said thermal spray method comprising controlling thermal spray parameters to produce an inner dense layer of thermal spray metal or metal alloy material on the release agent layer and a more porous outer layer as the thickness of the thermal spray metal or metal alloy material layer increases; wherein said thermal spray metal or metal alloy material is applied at a gun-to-substrate linear velocity of greater than 0.5 meters/second or a power input factor from 0.5 to 45 watts/millimeter/second, said thermal spray metal or metal alloy material layer is applied to a thickness of between 0.0001 and about 3 inches, said inner layer has a theoretical density of between about 95 and about 99.9 percent and comprises from about 5 to about 50 percent of the thickness of said thermal spray metal or metal alloy material layer, and said outer layer has a porosity of between about 5 and about 95 percent and comprises from about 5 to about 50 percent of the thickness of said thermal spray metal or metal alloy material layer;

(d) integrating the thermal spray metal or metal alloy material layer into a composite object by backing and infusing the thermal sprayed metal or metal alloy material layer with a resin; and (e) separating the infused or impregnated composite coated spray material from the release agent coated pattern to produce said thermal sprayed metal or metal alloy material surface infused or impregnated composite object.

4. The method of claim 3 wherein the thermal spray metal or metal alloy material is selected from steel, stainless steel, copper, tin, nickel, invar, chrome, tungsten, aluminum, zinc, alloys thereof or compounds thereof.

5. The method of claim 3 wherein step (d) is modified as follows: (d') integrating the thermal spray metal or metal alloy material layer into a composite object by backing the thermal sprayed metal or metal alloy material layer with fiber and infusing with a resin.

6. The method of claim 5 where the thermal spray metal or metal alloy material is a metal matrix ceramic composite.

7. The method of claim 5 wherein the release agent is selected from epoxies, urethanes, acrylics or polyvinyl acetates.

8. The method of claim 5 wherein the fiber is selected from carbon fiber, glass fiber or nylon fiber, and the resin is selected from an epoxy or prepreg materials.

9. The method of claim 5 wherein the inner dense layer of the thermal spray metal or metal alloy material in step (c) has a density of at least 95% theoretical density.

10. The method of claim 5 wherein the entire spray material layer in step (c) has a porosity between about 5% and about 75%.

11. The method of claim 5 wherein after step (c), the following steps are added:

(c') encasing the periphery of the pattern with a seal;

(c") dispersing fiber and resin materials within the peripheral seal and onto the thermal spray metal or metal alloy material layer.

12. The method of claim 11 wherein in step (d) the impregnation or infusion of the resin into at least the outer layer of the deposited thermal spray metal or metal alloy material is done by using a vacuum force.

13. The method of claim 11 wherein in step (d), the impregnation or infusion of the resin into at least the outer layer of the deposited thermal spray metal or metal alloy material is done using a mechanical or hydraulic force.

14. The method of claim 5 wherein after step (e), the following steps are added:

(e') cleaning the pattern of contaminations; and (e") repeating steps (a) through (e') at least once.

15. The method of claim 14 wherein after step (c), the following steps are added:

(c') encasing the periphery of the pattern with a seal; and (c") dispersing fiber and resin materials within the peripheral seal and onto the thermal spray metal or metal alloy material layer.

16. The method of claim 3 wherein the more porous outer layer has a porosity of between about 25 and about 75 percent.

17. A thermal sprayed metal or metal alloy material surface infused or impregnated composite object made in accordance with the method of claim 3.

18. A thermal sprayed metal or metal alloy material surface infused or impregnated composite object made in accordance with the method of claim 5.

\* \* \* \* \*